United States Patent
Ikegami et al.

(10) Patent No.: US 11,726,831 B2
(45) Date of Patent: Aug. 15, 2023

(54) MODEL-BASED WORST CASE EXECUTION TIME ANALYSIS FOR PARTITIONED SYSTEMS

(71) Applicant: NORTHROP GRUMMAN SYSTEMS CORPORATION, Falls Church, VA (US)

(72) Inventors: Michael C. Ikegami, Palm Bay, FL (US); James A. Yarbrough, Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 380 days.

(21) Appl. No.: 17/108,391

(22) Filed: Dec. 1, 2020

(65) Prior Publication Data

US 2022/0171660 A1 Jun. 2, 2022

(51) Int. Cl.
*G06F 9/50* (2006.01)
*G06F 16/958* (2019.01)
*G06F 9/48* (2006.01)

(52) U.S. Cl.
CPC .......... *G06F 9/5066* (2013.01); *G06F 9/4881* (2013.01); *G06F 16/986* (2019.01)

(58) Field of Classification Search
None
See application file for complete search history.

(56) References Cited

U.S. PATENT DOCUMENTS

| | | | | |
|---|---|---|---|---|
| 10,310,896 B1* | 6/2019 | Kichak | ................. | G06F 9/4843 |
| 2007/0277151 A1* | 11/2007 | Brunel | ...................... | G06F 8/10 |
| | | | | 717/113 |
| 2018/0081720 A1* | 3/2018 | Zlatanchev | ........... | G06F 9/4887 |
| 2018/0143851 A1* | 5/2018 | Raj | ....................... | G06F 9/5038 |

OTHER PUBLICATIONS

Lei Ju et al: "Schedulability Analysis of MSC-based System Models", Real-Time and Embedded Technology and Applications Symposium, 2008. RTAS '08. IEEE, IEEE, Piscataway, NJ, USA, Apr. 22, 2008 (Apr. 2, 2008), pp. 215-224, XP031276770, ISBN: 978-0-7695-3146-5.

(Continued)

*Primary Examiner* — Eric C Wai
(74) *Attorney, Agent, or Firm* — John A. Miller; Shumaker, Loop & Kendrick

(57) ABSTRACT

A system and method for calculating worst case execution times for actions in a process that is partitioned into a number of sub-processes that perform certain ones of the actions and operate on their own partition schedule independent of the other partitions. The method includes providing a unified modeling language (UML) activity diagram including the actions in the process, identifying each action in the diagram, determining each possible processing path for the actions in the process, assigning each action in each path to one of the sub-processes in the partitions, determining the time that each action will take through each path based on the partition schedule, and integrating the times for performing the actions in each of the paths. The method reports a longest time for performing the process along each path based on the integration of the times.

18 Claims, 3 Drawing Sheets

(56) References Cited

OTHER PUBLICATIONS

Yan Li et al: "Timing Analysis of Concurrent Programs Running on Shared Cache Multi-Cores", Real-Time Systems Symposium, 2009, RTSS 2009. 30th IEEE, IEEE, Piscataway, NJ, USA, Dec. 1, 2009 (Dec. 1, 2009), pp. 57-67, XP031592054, ISBN:L 978-0-7695-3875-4.
Simona Bernardi et al: "Timing-Failure Risk Assessment of UML Design Using Time Petri Net Bound Techniques", IEEE Transactions of Industrial Informatics, IEEE Service Center, New York, NY, US, vol. 7, No. 1, Feb. 1, 2011 (Feb. 1, 2011), pp. 90-104, XP011334345, ISSN: 1551-3203, DOI: 10.1109/TII.2010.2098415.
Sharad Mailik, Margaret Martonosi, Yau-Tsun Steven Li; Static Timing Analysis of Embedded Software; Department of Electrical Engineering, Princeton University; 1997.
Jorge Garrido, Juan A.De La Puente, Juan Zamorano, Miguel A.De Miguel, Alejandro Alonso; Timing Analysis Tools In A Model-Driven Development Environment;vol. 50, Issue 1, Jul. 2017, pp. 5875-5880; Information Processing and Telecommunications Center (IPT) Universidad Politecnica de Madrid (UPM), Spain.

\* cited by examiner

MODEL-BASED WORST CASE EXECUTION TIME ANALYSIS FOR PARTITIONED SYSTEMS

BACKGROUND

Field

This disclosure relates generally to a system and method for calculating worst case execution times for actions in a process including a number of partitioned sub-processes and, more particularly, to a system and method for calculating worst case execution times for actions in a process including a number of partitioned sub-processes that includes assigning each action in each path of the process through an activity diagram to a sub-process and assigning each sub-process to a partition based on a partition schedule.

Discussion of the Related Art

Partitioned computer systems and processes are becoming an increasingly popular approach for reducing the size, weight and power requirements of embedded systems, where each partitioned process operates on its own schedule and possibly at its own processing rate. Partitioned processes are being increasingly used in the art to ensure time and space separation within safety critical systems. For example, a command to fire a weapon on a fighter aircraft would be go through several processes in a weapons release chain that may be partitioned based on their level of criticality to the aircraft.

These partitioned systems often run a frame-based schedule within the partitions to ensure that they meet any applicable safety requirements, where a deterministic guarantee of system timing is often required. Such system timing is often analyzed through two methods, namely, an analysis of the frame-based schedules to determine worst case timing and static timing analysis of the implemented code. Analysis of the frame-based schedules allows for early detection of timing issues in the system architecture, but is often a tedious process because every possible case within the system design and the partition's schedule to determine worst case timing requires a manual walk through.

SUMMARY

The following discussion discloses and describes a system and method for calculating worst case execution times for actions in a process that is partitioned into a number of sub-processes that perform certain ones of the actions and operate on their own partition schedule independent of the other partitions. The method identifies each action to be performed by the process, identifies a first action of all of the actions to be performed by the process, and determines all of the paths through the actions from the first action that could be performed by the process. The method further assigns each action in each path to one of the sub-processes in the partitions, determines when each sub-process is going to operate and for how long based on the partition schedule, and assigns each sub-process to a partition. The method also determines a time to complete the first action for one of the paths based on the partition schedule, determines whether a next action in the one path occurs in the same partition as the first action, and if so, determines the time to complete the next action based on the partition schedule, and if not, determines the time to go from the sub-process running in the partition having the first action to the sub-process running in the partition having the next action. The method continues determining whether next actions and previous actions occur in the same partition in this manner until the time for performing all of the actions for the one path is determined, and determines that there are no actions left to determine their timing in the one path. The method determines whether the time for performing all of the actions in all of the possible paths have been determined, and if not, determines the time to complete the actions beginning with the first action in another path based on the partition schedule in the same manner until the time for performing all of the actions for all of the paths is determined. The method integrates the times for performing the actions in each of the paths so as to determine how long each processing path takes.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a system and method for calculating worst case execution times for actions in a process including a number of partitioned sub-processes is merely exemplary in nature, and is in no way intended to limit the disclosure or its applications or uses.

Figure 1:
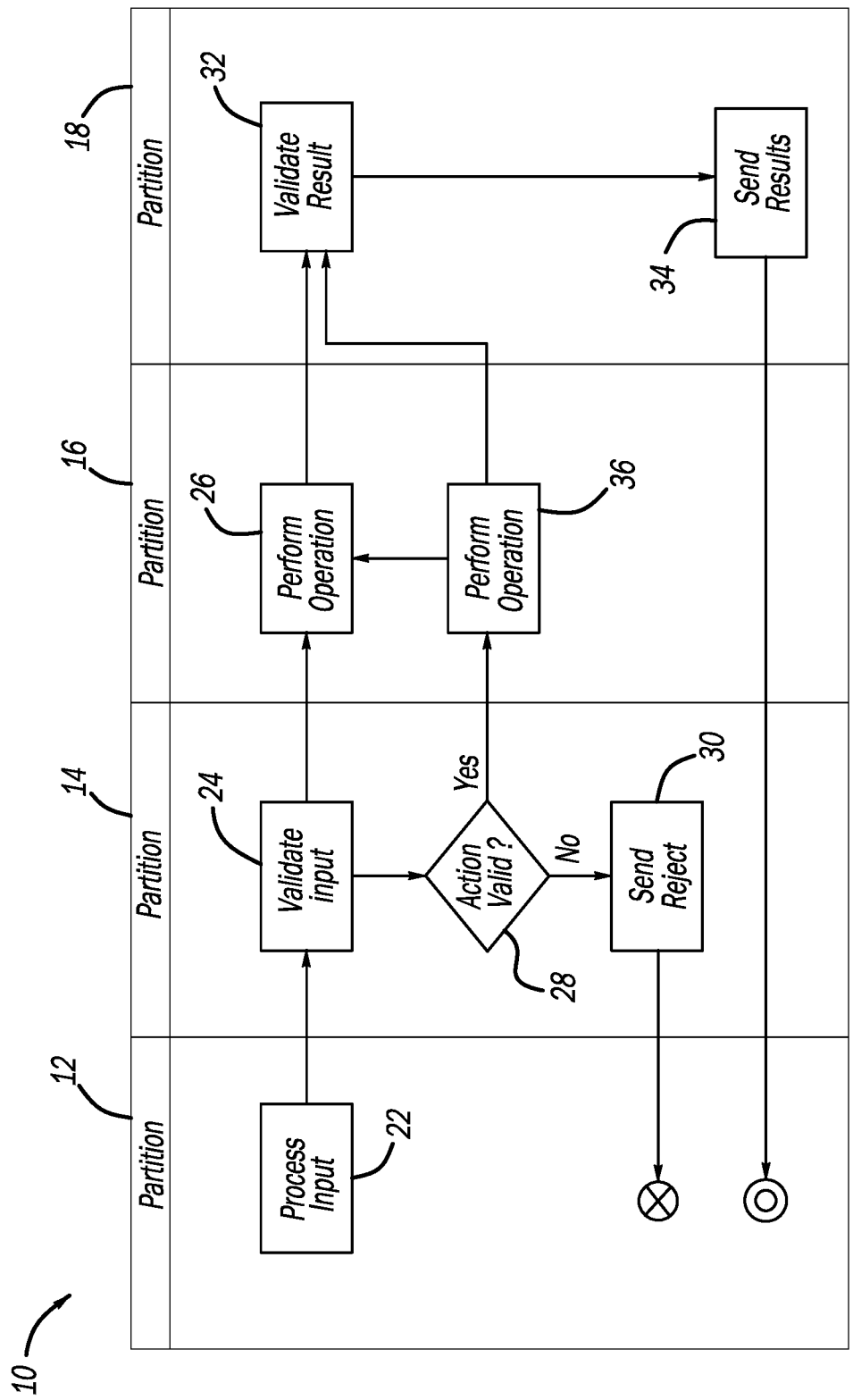
FIG. 1 is an illustration of an activity diagram showing partitioned sub-processes for a process.

FIG. 1 is an illustration of a unified modeling language (UML) activity diagram 10 showing a certain process performed by a system. The diagram includes four partitions 12, 14, 16 and 18 each representing the location of a partitioned or parsed sub-process that is part of the overall process is performed, where each sub-process operates concurrently based on its own schedule independent of the other sub-processes and at its own processing rate. In the diagram 10, the sub-process performed in the partition 12 processes inputs provided by a user at action box 22. The processed inputs from the action box 22 are then sent to an action box 24 in the partition 14 that validates the input information. The action performed at the action box 24 validates the inputs and may pass the validated inputs to be operated on in a first operation action box 26 in the partition 16 or may pass the validated inputs to a decision action 28 in the partition 14 to determine if the action is valid, where if the action is not validated at the decision action 28, a reject message is sent at action box 30 back to the partition 12 to notify the user of a non-valid action. If the operation is performed at the box 26, the results of the action is then validated at action box 32 in the partition 18, and the results of the validation operation is sent to action box 34 in the partition 18 to notify the partition 12 of the results. If the action is validated at the decision action 28, the validated inputs are passed to a second operation action box 36 in the partition 16 that may perform the operation and then send the processed inputs to the action box 26 or may directly pass the processed inputs to the box 32.

The flow of information from partition to partition and action to action as described can take four separate paths that require different processing times. Thus, it is necessary to determine the maximum time the processing can occur in each of the partitions 12-18 to know when to perform the sub-processes in the other partitions 12-18. In this example, a first path includes processing the input at the box 22, then validating the input at the box 24, then performing the operation at the box 26, then validating the results of the operation at the box 32, then sending the results at the box 34 and then providing an activity final report in the partition 12. A second path includes processing the input at the box 22, then validating the input at the box 24, then determining that the operation is valid at the decision action 28, then performing the action at the box 36, then validating the results at the box 32, then sending the results at the box 34 and then providing an activity final report in the partition 12. A third path includes processing the input at the box 22, then validating the input at the box 24, then determining that the operation is valid at the decision diamond 28, then performing the operation at the box 36, then performing the operation at the box 26, then validating the results at the box 32, then sending the results at the box 34 and then providing an activity final report in the partition 12. A fourth path includes processing the input at the box 22, then validating the input at the box 24, then determining that the operation is not valid at the decision diamond 28, then sending the reject message at the box 30 and then providing an activity final report in the partition 12.

Figure 2:
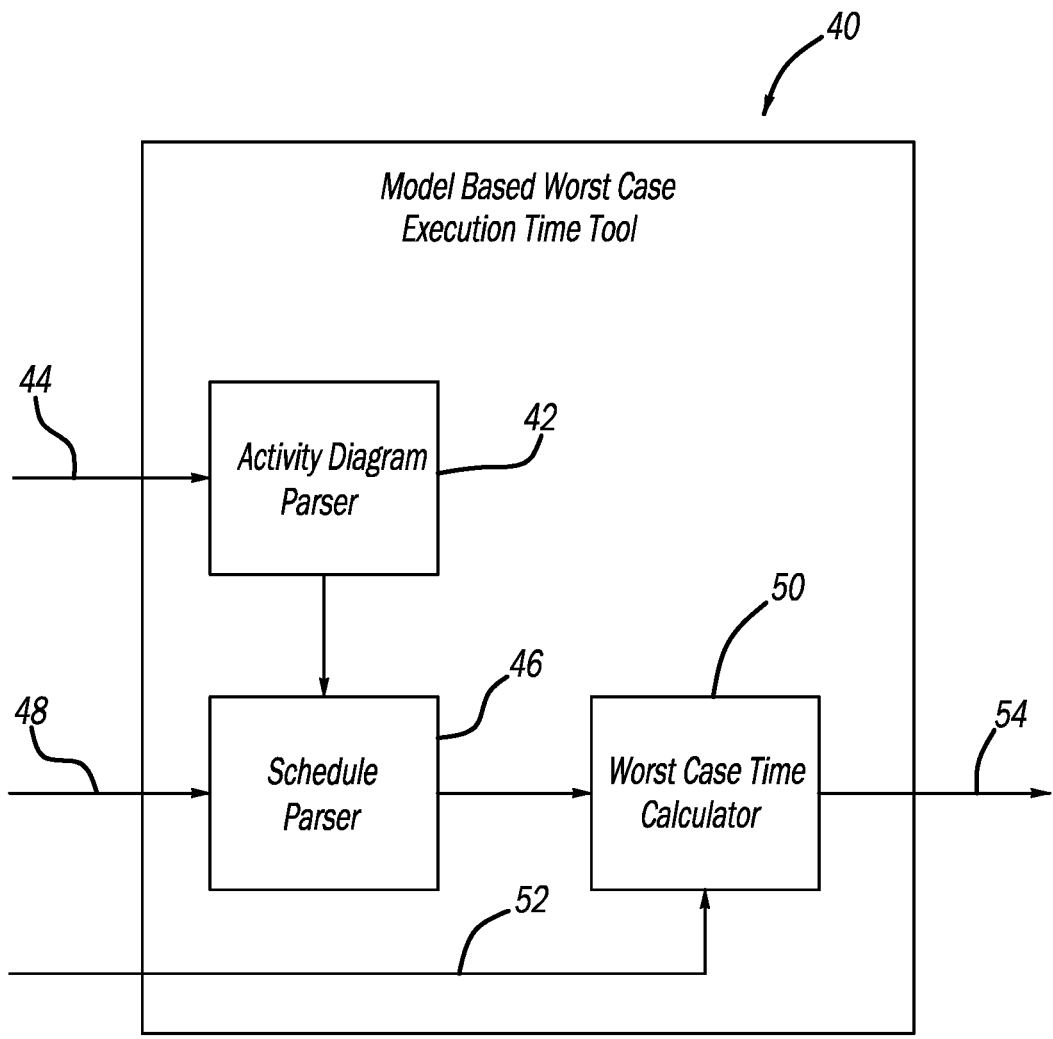
FIG. 2 is a block diagram of a system for calculating worst case execution times of processing paths through partitioned processes.

FIG. 2 is a block diagram of a system 40 for calculating worst case execution times for actions in a process including a number of partitioned sub-processes, where the system 40 is intended to represent any processor, computer or computing system capable of performing the operations discussed herein. The system 40 includes an activity diagram parser processor 42 that receives a UML activity diagram from a user on line 44 in, for example, an extensible markup language (XML), such as in an XMI format (XML metadata interchange), which is a standard for exchanging metadata information. The processor 42 identifies each action in the diagram, determines each possible processing path for those actions in the process and assigns those actions to a sub-process. This information is provided to a schedule parser processor 46 that also receives partition schedules on line 48 from the user that identifies when and for how long each sub-process will run. The processor 46 determines the time that each action will take through each path based on the schedule including the time to move from one partition to another partition if the path crosses between more than one partition. The time for performing the actions for each path is provided to a worst case time calculator 50 that also could receive timing constraints from the user on line 52, which calculates the worst case execution time for the path having the longest run time and provides that time on line 54.

Figure 3:
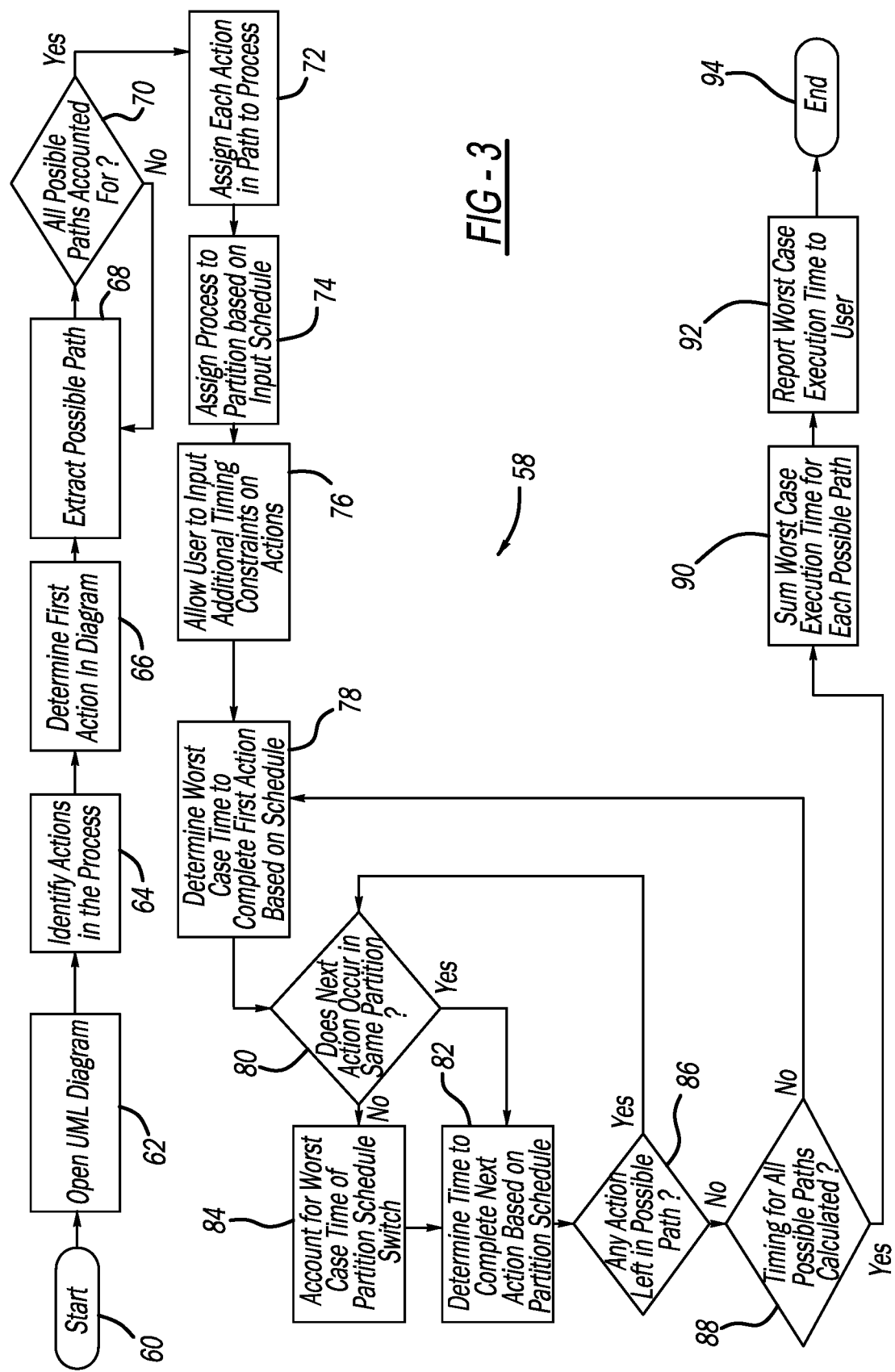
FIG. 3 is a flow chart diagram showing a process for calculating the worst case execution times in the system shown in FIG. 2.

FIG. 3 is a flowchart diagram 58 showing the operation of a processing tool for calculating the worst case timing of a certain process using, for example, the system 40. The tool starts at box 60, opens the file provided by a user for a certain activity diagram associated with the process in the XMI format at box 62 and identifies each individual action in the process at box 64. The tool then determines the first action to be performed by the process in the diagram at box 66 and identifies one of the possible processing paths from that action through the diagram to complete the process at box 68. The tool then determines if all of the possible paths from the first action through the diagram have been identified at decision diamond 70, and if not, returns to the box 68 to identify another processing path from the first action. If all of the processing paths are identified at the decision diamond 70, then the tool assigns each action in each path to a particular partitioned sub-process at box 72, which gives the tool an understanding of the processes to be performed in the activity diagram. All of the operations performed at the boxes 62-72 are performed in the activity diagram parser 42.

The tool now knows which action is identified with which sub-process and the processing schedule tells the tool when each sub-process is going to operate and for how long. Using this information, the tool assigns each sub-process to one of the partitions 12-18 at box 74. The tool then allows a user to input additional timing constraints at box 76, which may not be part of one of the sub-processes performed in the partitions 12-18. The tool then determines the worst case or longest time to complete the first action for one of the possible paths based on the partition schedule and stores that time at box 78. Once the worst case time is identified for the first action for that path, the tool determines whether the next action in that path occurs in the same partition as the first action at decision diamond 80, and if so, the tool determines the worst case time to complete the next action based on the partition schedule and stores that time at box 82. If the tool determines that the next action in that path does not occur in the same partition as the first action at the decision diamond 80, the tool determines the longest time to go from the sub-process running in the partition with the first action to the sub-process running in the partition having the next action and stores that time at box 84. In other words, the sub-processes running in the separate partitions 12-18 are not synchronized, where operation of an action may have to wait for the schedule of the other partition. That partition change or switch time is then added to the time to perform the subsequent actions in the box 82.

The tool then determines if there are any actions left in the possible path currently being analyzed at decision diamond 86, and if so, returns to the decision diamond 80 to determine whether a next action in that path occurs in the same partition as the preceding action. The tool continues processing the loop around the decision diamonds 80 and 86 and the boxes 82 and 84 until the worst case timing for performing all of the actions for the current path being analyzed, including changing of partitions, are identified and stored. If there are no actions left in the possible path currently being analyzed at the decision diamond 86, the tool then determines whether the worst case timing of the actions for all of the possible paths have been calculated at decision diamond 88, and if not, the tool returns to the box 78 to determine the worst case time to complete the first action in another path based on the partition schedule. The tool continues processing the loop around the decision diamonds 80, 86 and 88 and the boxes 78, 82 and 84 until the worst case timing for performing all of the actions for all of the paths, including changing of partition sub-processes, are identified and stored. For this example, there would be four paths that are analyzed. All of the operations performed at the boxes 74-88 are performed in the schedule parser 46.

When the worst case time to perform all of the actions in all of the possible paths have been calculated at the decision diamond 88, then the tool integrates the worst case execution times for the actions and partition switching for each path at box 90, reports the worst case execution time for the slowest path and the worst case execution time for each path at box 92, and the tool ends at box 94. All of the operations performed at the boxes 90 and 92 are performed in the worst case time calculator 50.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for determining timing of a process and being performed in a computing system, said process being partitioned into a number of sub-processes that perform certain actions and operate on their own partition schedule independent of the other partitions, said method comprising:

identifying each action to be performed by the process;

identifying a first action of all of the actions to be performed by the process;

determining all of the paths through the actions from the first action that could be performed by the process;

assigning each action in each path to one of the sub-processes in the partitions, wherein identifying each action, identifying a first action, determining all of the paths and assigning each action in each path are performed in an activity diagram parser in the computing system;

determining when each sub-process is going to operate and for how long based on the partition schedule;

assigning each sub-process to a partition;

determining a time to complete the first action for one of the paths based on the partition schedule;

determining whether a next action in the one path occurs in the same partition as the first action, and if so, determining the time to complete the next action based on the partition schedule, and if not, determining the time to go from the sub-process running in the partition having the first action to the sub-process running in the partition having the next action;

continuing determining whether next actions and previous actions occur in the same partition in this manner until the time for performing all of the actions for the one path is determined;

determining that there are no actions left to determine their timing in the one path;

determining whether the time for performing all of the actions in all of the possible paths have been determined, and if not, determining the time to complete the actions beginning with the first action in another path based on the partition schedule in the same manner until the time for performing all of the actions for all of the paths is determined, wherein determining when each sub-process is going to operate, assigning each sub-process to a partition, determining a time to complete the first action, determining whether a next action in the one path occurs in the same partition as the first action, continuing determining whether next actions and previous actions occur in the same partition, determining that there are no actions left and determining whether the time for performing all of the actions in all of the possible paths have been determined are performed in a schedule parser in the computing system; and integrating the times for performing the actions in each of the paths.

2. The method according to claim 1 wherein determining the time to complete the actions includes determining the longest time for performing the actions.

3. The method according to claim 1 further comprising reporting a longest time for performing the process along each path based on the integration of the times.

4. The method according to claim 1 further comprising inputting additional timing constraints for the actions prior to determining a time to complete the first action.

5. The method according to claim 1 further comprising providing a unified modeling language (UML) activity diagram that is used to identify the actions and determine all of the paths through the partitioned sub-processes.

6. The method according to claim 5 wherein the UML activity diagram is in an extensible markup language (XML) format.

7. The method according to claim 5 wherein the activity diagram and the partition schedule are provided by a user.

8. A method for determining timing of a process and being performed in a computing system, said process being partitioned into a number of sub-processes that perform certain actions and operate on their own partition schedule independent of the other partitions, said method comprising:

providing a unified modeling language (UML) activity diagram including the actions in the process;

identifying each action in the diagram;

determining each possible processing path for the actions in the process;

assigning each action in each path to one of the sub-processes in the partitions, wherein identifying each action, determining each possible processing path and assigning each action in each path are performed in an activity diagram parser in the computing system;

determining the time that each action will take through each path based on the partition schedule in a schedule parser in the computing system; and integrating the times for performing the actions in each of the paths.

9. The method according to claim 8 wherein determining the time that each action will take includes determining the longest time for performing the actions.

10. The method according to claim 8 further comprising reporting a longest time for performing the process along each path based on the integration of the times.

11. The method according to claim 8 further comprising inputting additional timing constraints for the actions prior to determining the time that each action will take.

12. A computing system for determining timing of a process, said process being partitioned into a number of sub-processes that perform certain actions and operate on their own partition schedule independent of the other partitions, said system comprising:

means for identifying each action to be performed by the process;

means for identifying a first action of all of the actions to be performed by the process;

means for determining all of the paths through the actions from the first action that could be performed by the process;

means for assigning each action in each path to one of the sub-processes in the partitions, wherein the means for identifying each action, the means for identifying a first action, the means for determining all of the paths and the means for assigning each action in each path are part of an activity diagram parser in the computing system;

means for determining when each sub-process is going to operate and for how long based on the partition schedule;

means for assigning each sub-process to a partition;

means for determining a time to complete the first action for one of the paths based on the partition schedule;

means for determining whether a next action in the one path occurs in the same partition as the first action, and if so, determining the time to complete the next action based on the partition schedule, and if not, determining the time to go from the sub-process running in the partition having the first action to the sub-process running in the partition having the next action;

means for continuing determining whether next actions and previous actions occur in the same partition in this manner until the time for performing all of the actions for the one path is determined;

means for determining that there are no actions left to determine their timing in the one path;

means for determining whether the time for performing all of the actions in all of the possible paths have been determined, and if not, determining the time to complete the actions beginning with the first action in another path based on the partition schedule in the same manner until the time for performing all of the actions for all of the paths is determined, wherein the means for determining when each sub-process is going to operate, the means for assigning each sub-process to a partition, the means for determining a time to complete the first action, the means for determining whether a next action in the one path occurs in the same partition as the first action, the means for continuing determining whether next actions and previous actions occur in the same partition, the means for determining that there are no actions left and the means for determining whether the time for performing all of the actions in all of the possible paths have been determined are part of a schedule parser in the computing system; and means for integrating the times for performing the actions in each of the paths.

13. The system according to claim 12 wherein the means for determining the time to complete the actions determines the longest time for performing the actions.

14. The system according to claim 12 further comprising means for reporting a longest time for performing the process along each path based on the integration of the times.

15. The system according to claim 12 further comprising means for inputting additional timing constraints for the actions prior to determining a time to complete the first action.

16. The system according to claim 12 further comprising means for providing a unified modeling language (UML) activity diagram that is used to identify the actions and determine all of the paths through the partitioned sub-processes.

17. The system according to claim 16 wherein the UML activity diagram is in an extensible markup language (XML) format.

18. The system according to claim 16 wherein the activity diagram and the partition schedule are provided by a user.

* * * * *